United States Patent
Liu

(10) Patent No.: US 10,481,710 B2
(45) Date of Patent: Nov. 19, 2019

(54) TOUCH DISPLAY APPARATUS CAPABLE OF FINGERPRINT RECOGNITION AND FINGERPRINT RECOGNITION MODULE

(71) Applicant: ILI TECHNOLOGY CORP., Hsinchu County (TW)

(72) Inventor: Tzu Wei Liu, Hsinchu Hsien (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 15/227,159

(22) Filed: Aug. 3, 2016

(65) Prior Publication Data
US 2017/0068365 A1   Mar. 9, 2017

(30) Foreign Application Priority Data

Sep. 3, 2015 (TW) .............................. 104129129 A

(51) Int. Cl.
*G06F 3/041* (2006.01)
*G06F 3/044* (2006.01)
*G06K 9/00* (2006.01)

(52) U.S. Cl.
CPC ............ *G06F 3/0412* (2013.01); *G06F 3/044* (2013.01); *G06K 9/00013* (2013.01); *G06F 2203/04111* (2013.01)

(58) Field of Classification Search
CPC ......... G06F 2203/04111; G06F 3/0412; G06F 3/044; G06F 21/32; G06F 21/31; G06K 9/00013; G06K 9/0006; H04L 63/0861
See application file for complete search history.

(56) References Cited

U.S. PATENT DOCUMENTS

| 2007/0076923 | A1* | 4/2007 | Chiu ................. G06K 9/00013 382/124 |
| 2011/0227846 | A1* | 9/2011 | Imazeki ................. G06F 3/044 345/173 |
| 2011/0267298 | A1* | 11/2011 | Erhart .................... G06F 1/1626 345/173 |
| 2012/0242635 | A1* | 9/2012 | Erhart .................... G06F 1/1626 345/207 |
| 2013/0135247 | A1* | 5/2013 | Na ........................... G06F 21/32 345/174 |
| 2014/0333328 | A1* | 11/2014 | Nelson .................... G06F 3/044 324/663 |
| 2014/0362036 | A1* | 12/2014 | Mo .......................... G06F 3/044 345/174 |

(Continued)

FOREIGN PATENT DOCUMENTS

WO    WO 2015109828 A1 *  7/2015    ......... G06K 9/00013

*Primary Examiner* — Hong Zhou
(74) *Attorney, Agent, or Firm* — JCIPRNET

(57) ABSTRACT

A touch display apparatus capable of fingerprint recognition includes a display panel, a cover plate, a touch sensing electrode set and a fingerprint recognition electrode set. The display panel includes a first surface. The cover plate covers the first surface of the display panel, and includes a second surface facing the first surface of the display panel. The touch sensing electrode set is disposed between the display panel and the cover plate. The fingerprint recognition electrode set is directly formed on the first surface of the display panel or the second surface of the cover plate. The cover plate further covers the fingerprint recognition electrode set.

10 Claims, 12 Drawing Sheets

(56) References Cited

U.S. PATENT DOCUMENTS

| | | | |
|---|---|---|---|
| 2015/0071508 A1* | 3/2015 | Boshra | G06K 9/00013 382/124 |
| 2015/0071648 A1* | 3/2015 | Hong | H04B 10/114 398/131 |
| 2015/0324625 A1* | 11/2015 | Mo | G06F 21/32 382/124 |
| 2015/0371076 A1* | 12/2015 | Lee | G06F 3/041 382/124 |
| 2016/0042217 A1* | 2/2016 | Kim | G06F 3/041 382/124 |
| 2016/0054844 A1* | 2/2016 | Lin | G06F 3/0416 345/173 |
| 2016/0063230 A1* | 3/2016 | Alten | G06F 21/32 726/28 |
| 2016/0337559 A1* | 11/2016 | Liu | G06K 9/00013 |
| 2016/0379036 A1* | 12/2016 | Long | G06K 9/00013 382/124 |

* cited by examiner

TOUCH DISPLAY APPARATUS CAPABLE OF FINGERPRINT RECOGNITION AND FINGERPRINT RECOGNITION MODULE

This application claims the benefit of Taiwan application Serial No. 104129129, filed Sep. 3, 2015, the subject matter of which is incorporated herein by reference.

BACKGROUND OF THE INVENTION

Field of the Invention

The invention relates in general to a touch display apparatus and a fingerprint recognition module thereof, and more particularly, to a touch display apparatus capable of fingerprint recognition that integrates a touch sensing electrode set and a fingerprint recognition electrode set between a display panel and a cover plate, and a fingerprint recognition module thereof.

Description of the Related Art

As the development and application of consumer electronic products become more and more comprehensive in the recent years, the number of products applying touch display apparatuses formed by integrating the touch function and a display apparatus has also increased. For example, these touch display apparatuses include mobile phones, Global Positioning System (GPS) navigation systems, tablet computers, digital personal assistants (PDA) and laptop computers. A portable touch display apparatus is usually for personal use, and thus a part of stored data connected to the touch control apparatus is usually private. To prevent others from easily obtaining private personal data, fingerprint recognition has been developed for personal identification and verification. A conventional fingerprint recognition apparatus is independently manufactured, i.e., manufactured separately from a portable touch display apparatus. As a result, an additional assembly step to attach a fingerprint recognition apparatus to a portable touch display apparatus is required, hence increasing assembly complexity as well as the weight of the portable touch display apparatus.

SUMMARY OF THE INVENTION

The invention is directed to a touch display apparatus to reduce the weight and assembly complexity of a touch display apparatus.

According to an embodiment of the present invention, a touch display apparatus capable of fingerprint recognition includes a display panel, a cover plate, a touch sensing electrode set and a fingerprint recognition electrode set. The display panel includes a first surface. The cover plate covers the first surface, and includes a second surface facing the first surface. The touch sensing electrode set is disposed between the display panel and the cover plate. The fingerprint recognition electrode set is directly formed on the first surface of the display panel or directly formed on the second surface of the cover plate. The cover plate further covers the fingerprint recognition electrode set.

According to another embodiment of the present invention, a touch display apparatus capable of fingerprint recognition includes a display panel, a cover plate, a touch sensing electrode set, a substrate and a fingerprint recognition electrode set. The display panel includes a first surface. The cover plate covers the first surface of the display panel, and includes a second surface facing the first surface. The touch sensing electrode set is disposed between the display panel and the cover plate. The substrate includes a third surface facing the second surface. The fingerprint recognition electrode set is formed on the third surface of the substrate. The cover plate further covers the fingerprint recognition electrode set.

According to another embodiment of the present invention, a fingerprint recognition module is formed on a substrate, and includes at least one key, a fingerprint recognition electrode set and a chip. The key is disposed on the substrate. The fingerprint recognition electrode set is formed on the substrate. The chip is soldered on the substrate. The key and the fingerprint recognition electrode set are electrically connected to the chip.

The touch sensing electrode set and the fingerprint recognition module of the present invention are integrated in the same touch display apparatus, so as to reduce the weight of the touch display apparatus as well as a user loading and to prevent complicated manufacturing processes of the touch sensing electrode set and the fingerprint recognition electrode set.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
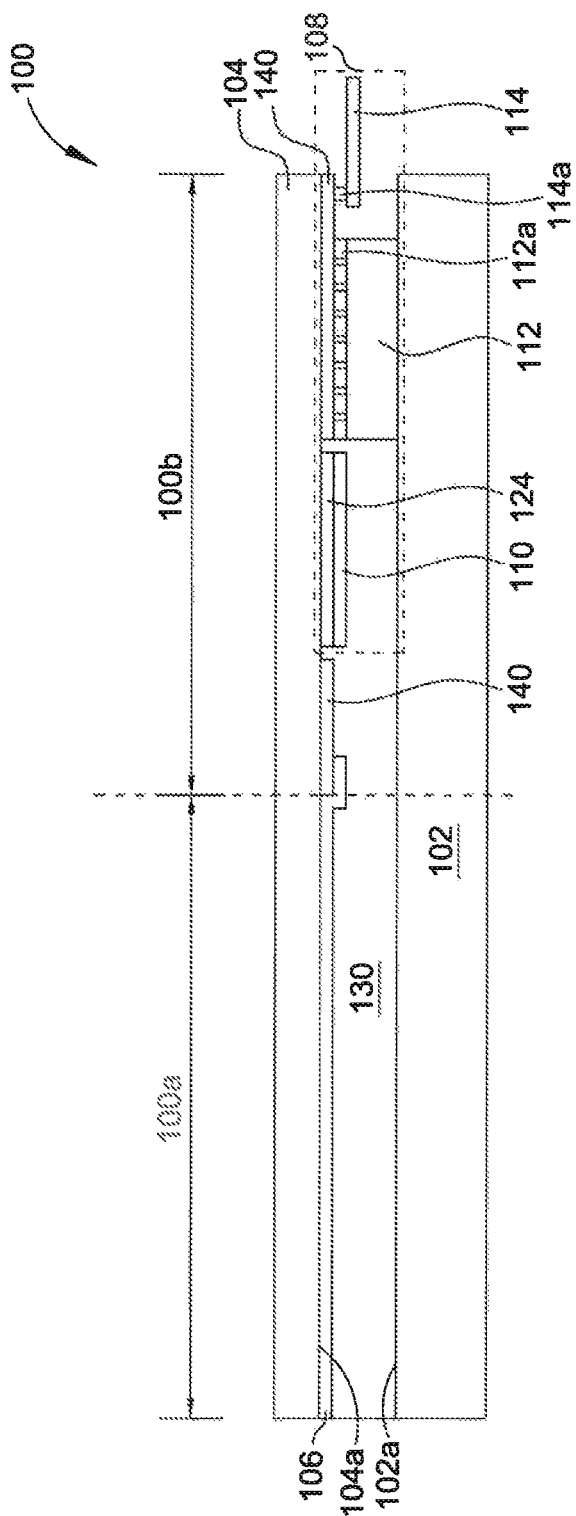
FIG. 1 is a section view of a touch display apparatus according to a first embodiment of the present invention.

FIG. 1 shows a section view of a touch display apparatus according to a first embodiment of the present invention. As shown in FIG. 1, a touch display apparatus 100 includes a touch display region 100a and a border region 100b. One part of the touch display apparatus 100 located at the touch display region 100a serves for image display and touch sensing. Another part of the touch display apparatus 100 located at the border region 100b comprises non-transparent components, e.g., connecting lines at the borders or chips for controlling image display and touch sensing, and components providing other functions, e.g., a fingerprint recognition electrode set or function keys. The touch display apparatus 100 includes a display panel 102, a cover plate 104, a touch sensing electrode set 106 and a fingerprint recognition module 108. The display panel 102, having the touch display region 100a and the border region 100b, includes a first surface 102a. The display panel 102 may display an image from the first surface 102a to be viewed by an user. For example, the display panel 102 may be a liquid crystal display (LCD), an organic light emitting display (OLED), an electrowetting display, an electrophoretic display, a plasma display or other types of display devices. In this embodiment, for example but not limited to, the display panel 102 may extend from the touch display region 100a to the border region 100b. The cover plate 104 is located above the first surface 102a of the display panel 102, and covers the touch display region 100a and the border region 100b to protect the display panel 102 or other components of the touch display apparatus 100 from damages caused by collisions of sharp objects and intensive impacts. The cover plate 104 includes a second surface 104a facing the first surface 102a of the display panel 102. To have the image of the display panel 102 perceivable by a user, the cover plate 104 is a transparent substrate, for example but not limited to, a glass substrate, a tempered glass substrate, a quartz substrate, a sapphire substrate or a plastic substrate. Preferably, the touch display apparatus 100 may further include a first decoration layer 140. The first decoration layer 140 is formed on the second surface 104a of the cover plate 104, and covers the border region 100b to shield the part of the touch display apparatus 100 that does not display an image to further beautify the appearance of the touch display apparatus 100.

The fingerprint recognition module 108 includes a fingerprint recognition electrode set 110, a chip 112 and a flexible circuit board 114. The fingerprint recognition electrode set 110 is disposed between the display panel 102 and the cover plate 104 in the border region 100b, and the cover plate 104 covers the fingerprint recognition electrode set 110 along a direction perpendicular to the second surface 104a, such that the fingerprint recognition electrode set 110 may detect a user fingerprint through the cover plate 104. In this embodiment, the fingerprint recognition electrode set 110 is directly formed on the second surface 104a of the cover plate 104. The chip 112 may be soldered to a conducting line on the first surface 102 through a solder pad, and be electrically connected to the fingerprint recognition electrode set 110 to allow the fingerprint recognition electrode set 10 to perform fingerprint recognition through the chip 112 or to further process the signal that the fingerprint recognition electrode set 110 detects. The flexible circuit board 114 may be soldered to a conducting line of the first surface 102a through a solder pad 114a, and be electrically connected to the chip 112 to allow the chip 112 to electrically connect to other components through the flexible circuit board 114 to perform signal transmission. It should be noted that, to avoid an excessive load on the chip 12, the chip 112 in this embodiment may not be electrically connected to the touch sensing electrode set 106, and is thus not required to handle signal processing of both of the touch sensing electrode set 106 and the fingerprint recognition electrode set 110.

Figure 2:
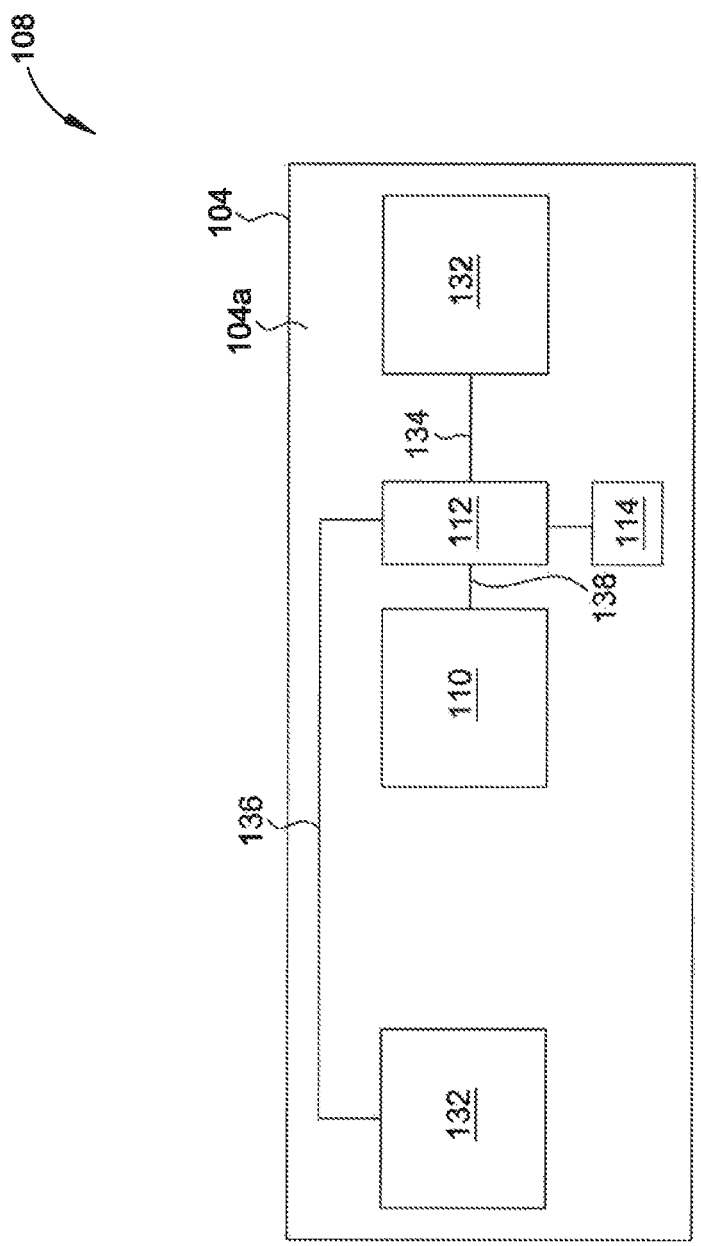
FIG. 2 is a top view of a fingerprint recognition module according to the first embodiment of the present invention.

FIG. 2 shows a top view of a fingerprint recognition module according to the first embodiment of the present invention. As shown in FIG. 2, the fingerprint recognition module 108 may further selectively include at least one key 132 formed on the second surface 104a and electrically connected to the chip 112. In this embodiment, the fingerprint recognition module 108 includes two keys 132 electrically connected to the chip 112 via a first conducting line group 134 and a second conducting line group 136, respectively. The fingerprint recognition electrode set 110 is further electrically connected to the chip 112 via a third conducting line group 138. It should be noted that, through expanding the function of the chip 112, the fingerprint recognition module 108 of this embodiment allows a user to perform additional functions through different keys 132. The key 132 may serve for triggering the fingerprint recognition module 108 to perform fingerprint recognition or may be completely irrelevant to fingerprint recognition. For example, the key 132 may be a virtual or physical key that controls the operating system of the touch display apparatus, e.g., a return, home or menu key. For example, the key 132 may be a pressing key, a capacitive sensing key, an optical sensing key or other types of keys.

Figure 3:
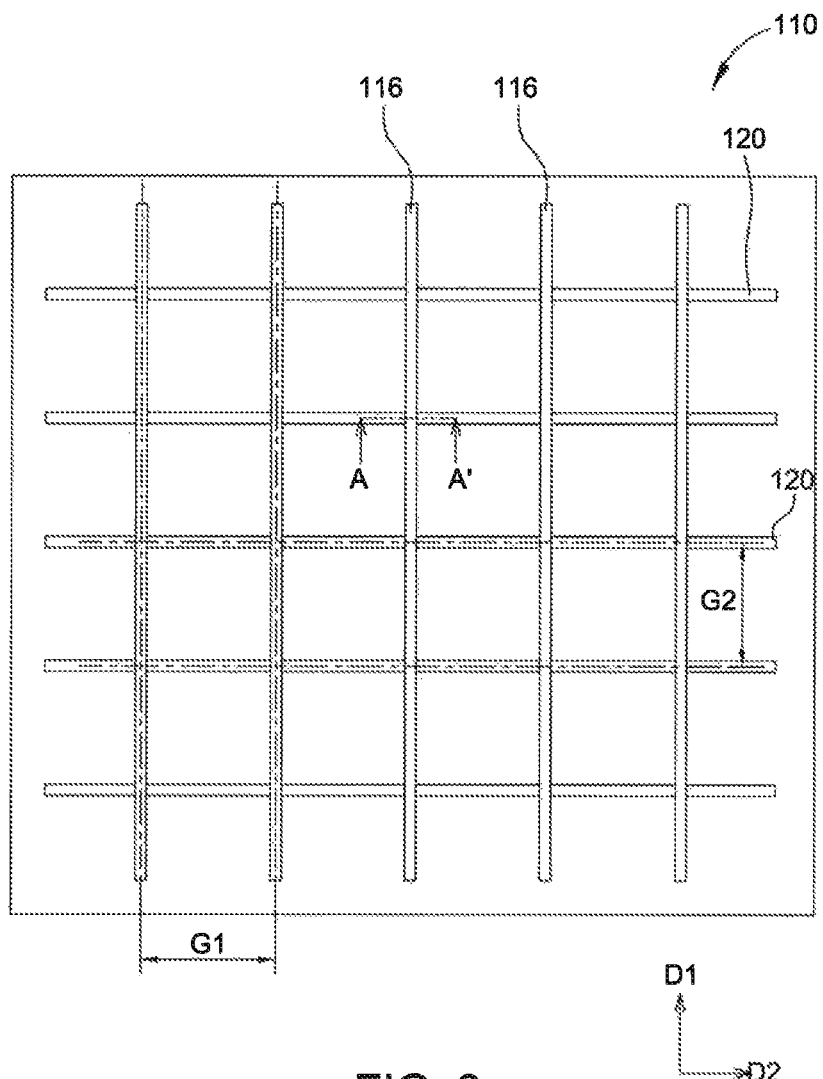
FIG. 3 is a top view of a fingerprint recognition electrode set according to the first embodiment of the present invention.
Figure 4:
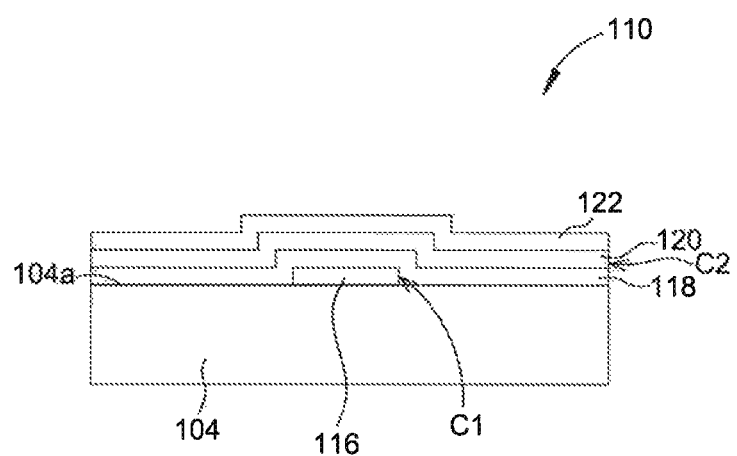
FIG. 4 is a section view of FIG. 3 along a section line A-A'.

FIG. 3 shows a top view of a fingerprint recognition electrode set according to the first embodiment of the present invention. FIG. 4 shows a section view of FIG. 3 along the section line A-A'. Referring to FIG. 3 and FIG. 4 as well as FIG. 1, the fingerprint recognition electrode set 110 of this embodiment includes a plurality of first electrode strips 116, a first insulating layer 118 and a plurality of second electrode strips 120. The first electrode strips 116 extend along a direction D1, and the second electrode strips 120 extend along a direction D2 different form the direction D1, in a way that each of the first electrode strips 116 crosses each of the second electrode strips 120. The first electrode strips 116 may be formed by a same first conductive pattern layer C1, the second electrode strips 120 may be formed by a same second electrode pattern layer C2, and the first conductive pattern layer C1 is disposed between the second conductive pattern layer C2 and the second surface 104a. For example, a gap G1 between center lines of two adjacent first electrode strips 116 and/or a gap G2 between center lines of two adjacent second electrode strips 120 may be approximately 40 μm to 60 μm, preferably 50 μm. Further, the first electrode strips 116 may serve as driving electrodes for transmitting driving signals, and the second electrode strips 120 may serve as sensing electrodes for sensing capacitance changes. As the gap G1 between any two adjacent first electrode strips 116 is small enough, and the gap G2 between any two adjacent second electrode strips 120 is small enough, the fingerprint recognition electrode set 110 is capable of identifying differences in capacitance changes of ridges and valleys of fingerprint ridges to further identify fingerprints. In another embodiment, the first electrode strips may serve as sensing electrodes, and the second electrode strips may serve as driving electrodes.

Further, the first insulating layer 118 is disposed between the first conductive pattern layer C1 and the second conductive pattern layer C2, such that the first electrode strips 116 and the second sensing electrodes 120 are electrically insulated. The fingerprint recognition electrode group 110 may further selectively include a second insulating layer 122. The second insulating layer 122 covers the second conductive pattern layer C2 and the first insulating layer 118 to protect the first electrode strips 116 and the second electrode strips 120. Further, the first conductive pattern layer C1 and/or the second conductive pattern layer C2 may be used to form the first, second and third conducting line groups 134, 136 and 138 and/or chip pads, and are/is connected between the chip 112 and the fingerprint recognition electrode set 110. In another embodiment, the second conductive pattern layer may be disposed between the first conductive pattern layer and the second surface.

It should be noted that, the fingerprint recognition 110 of this embodiment is directly formed on the second surface 104a of the cover plate 104, and detects fingerprints at an outer surface of the second surface 104a of the cover plate 104. Thus, the cover plate 104 of this embodiment needs no an additional hole for revealing the fingerprint recognition module, hence reducing the possibility of cracks in the cover plate.

In this embodiment, the fingerprint recognition module 108 may selectively include a second decoration layer 124 disposed between the cover plate 104 and the fingerprint recognition module 110. The second decoration layer 124 helps the user in identifying the position of the fingerprint recognition module 110 and/or beautifies the appearance of the touch display apparatus 100. For example but not limited to, the first decoration layer 140 may include an opening for disposing the second decoration layer 124, in a way that the appearances of the second decoration layer 124 and the first decoration layer 140 may be distinguished to allow the user to identify the two. In another embodiment, the first decoration layer and the second decoration layer may be the same film, and indicate the position of the fingerprint recognition electrode set by a predetermined pattern. Further, as the first conductive pattern layer C1 and the second conductive pattern layer C2 for forming the fingerprint recognition module 110 may be shielded by the second decoration layer 124, the first conductive pattern layer C1 and the second conductive pattern layer C2 may include a non-transparent material or a transparent material.

Figure 5:
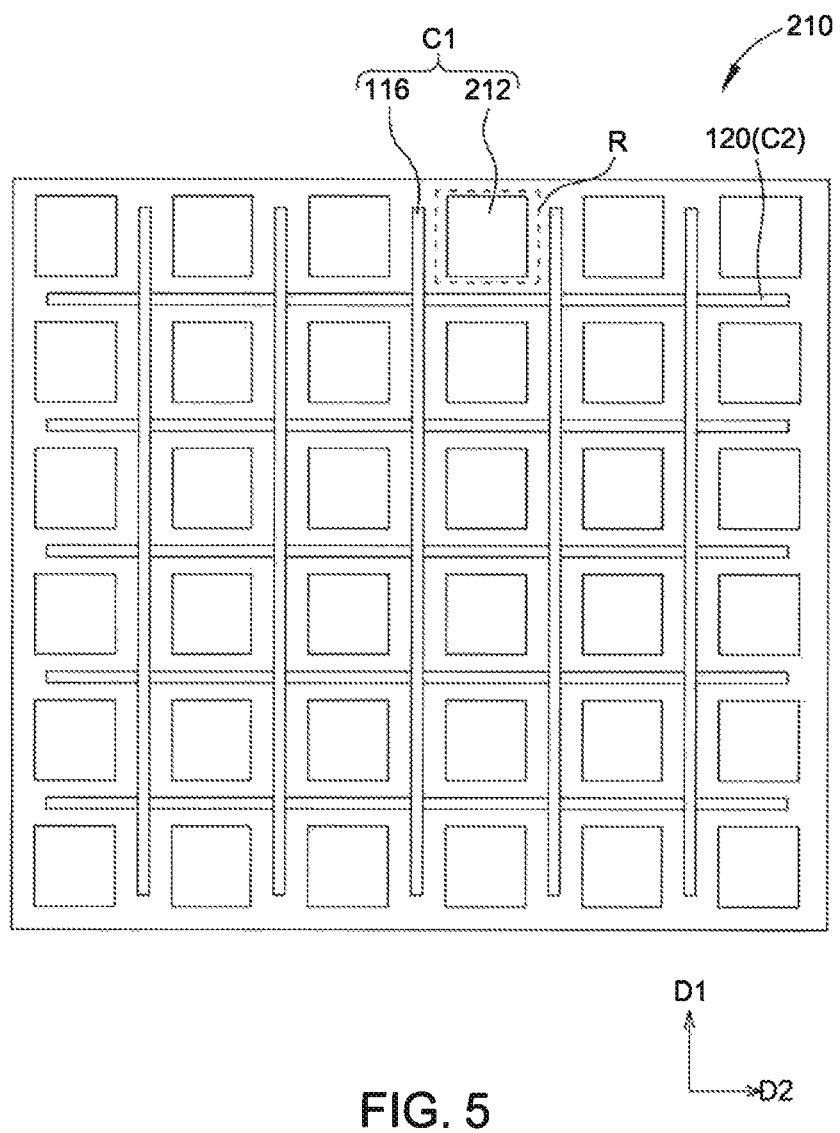
FIG. 5 is a top view of a first variation of the fingerprint recognition electrode set according to the first embodiment of the present invention.

The fingerprint recognition electrode set of the present invention is not limited to the above configuration. Variations of the fingerprint recognition electrode set of this embodiment are described below. To keep the description simple and to emphasize differences between the variations, the same denotations are used to represent the same components, and such repeated details shall be omitted. FIG. 5 shows a top view of a first variation of a fingerprint recognition electrode set according to the first embodiment of the present invention. Referring to FIG. 5 as well as FIG. 1, compared to the fingerprint recognition electrode set 110 of the first embodiment, a fingerprint recognition electrode set 210 of this variation may further include a plurality of floating electrodes that are not connected to any voltage. Any two adjacent first electrode strips 116 and any two adjacent second electrode strips 120 may surround to form a region R, in which each of the floating electrodes 212 is disposed on a one-to-one correspondence. Further, the floating electrodes 212 do not overlap the first electrodes strips 116 and the second electrode strips 120 along a direction perpendicular to the second surface 104a. In this variation, for example but not limited to, the floating electrodes 212 may be formed by the first conductive pattern layer C1. In another variation, the floating electrodes may also be formed by the second conductive pattern layer.

Figure 6:
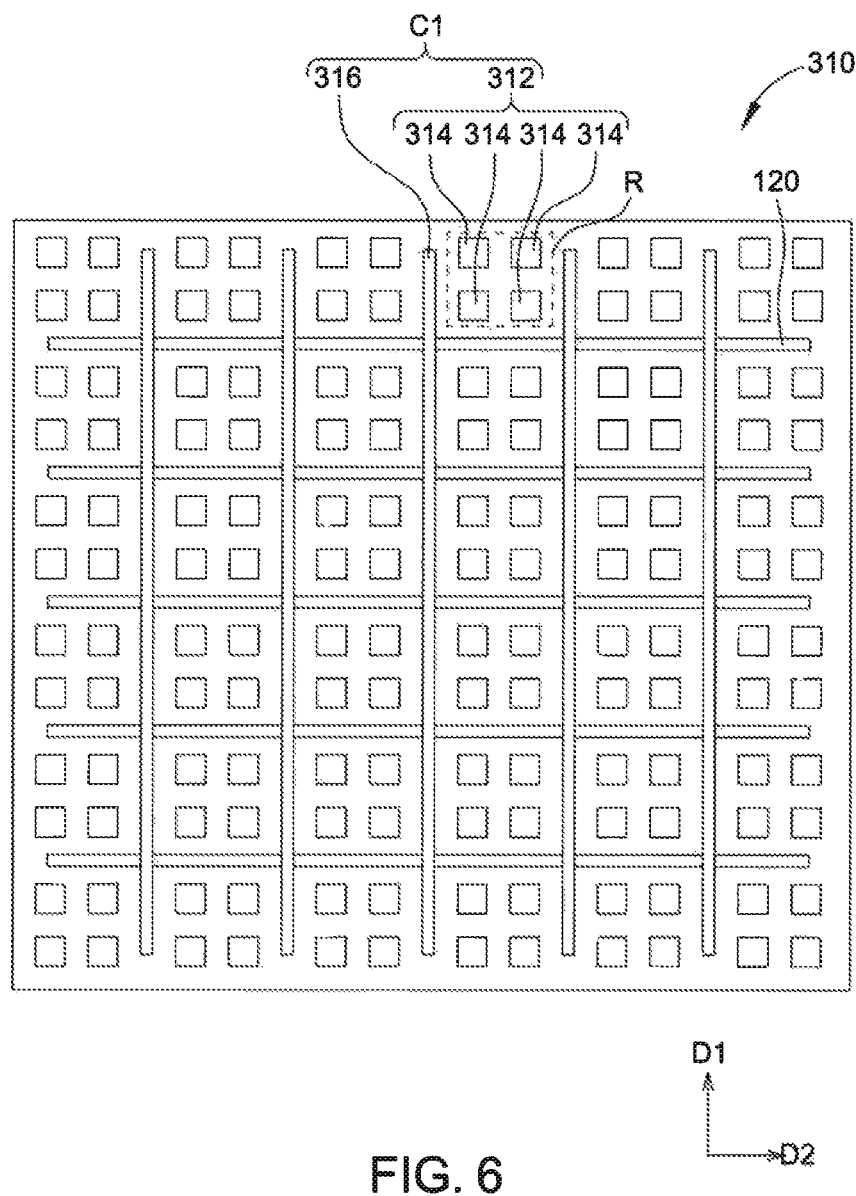
FIG. 6 is a top view of a second variation of the fingerprint recognition electrode set according to the first embodiment of the present invention.

FIG. 6 shows a top view of a second variation a fingerprint recognition electrode set of according to the first embodiment of the present invention. Referring to FIG. 6 as well as FIG. 1, compared to the fingerprint recognition electrode set 210 of the first variation, a fingerprint recognition electrode set 310 of this variation may further include a plurality of floating electrode sets 312, and each of the floating electrode sets 312 is disposed in each of the regions R on a one-to-one correspondence. Further, each of the floating electrode sets 312 includes a plurality of floating electrodes 314 arranged as an array in the region R. For example, each floating electrode set 312 of this embodiment may include four floating electrodes 314, and the floating electrodes 314 of one floating electrode set 312 are arranged in an array in one single region R. Further, the floating electrodes 314 do not overlap the first electrode strips 116 and the second electrode strips 120 along the direction perpendicular to the second surface 104a. In this embodiment, for example but not limited to, the floating electrodes 314 may be formed by the first conductive pattern layer C1. In another embodiment, the floating electrodes may also be formed by the second conductive pattern layer.

Figure 7:
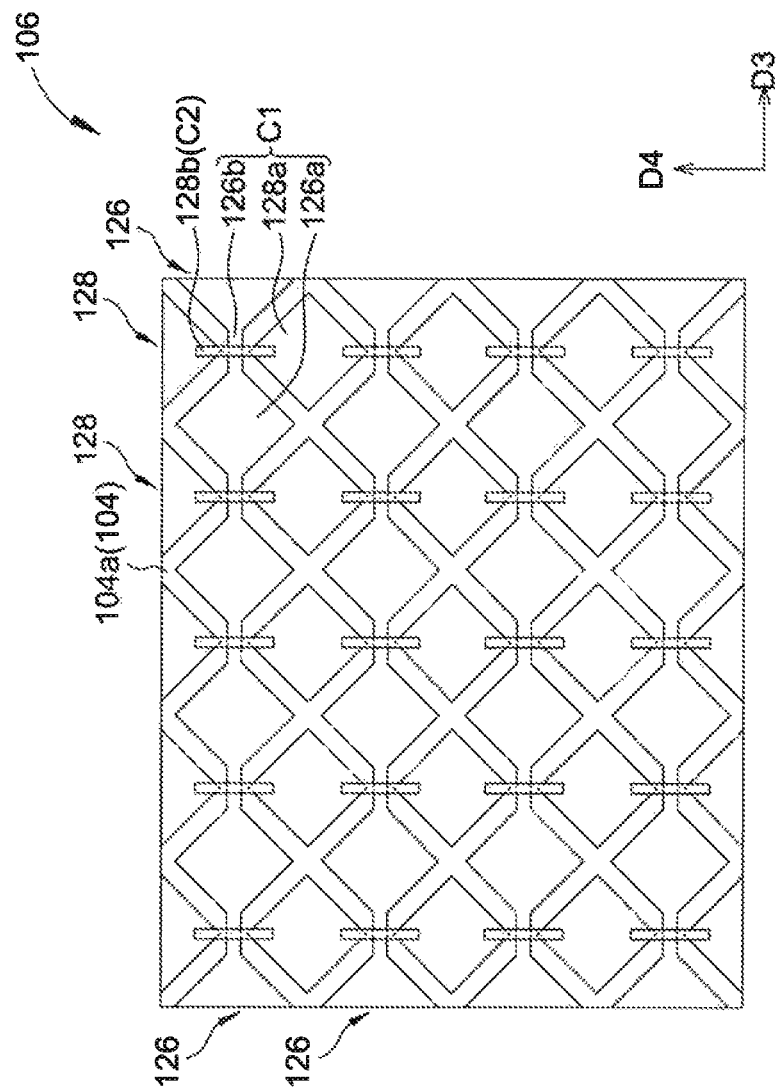
FIG. 7 is a top view of a touch sensing electrode set according to the first embodiment of the present invention.
Figure 8:
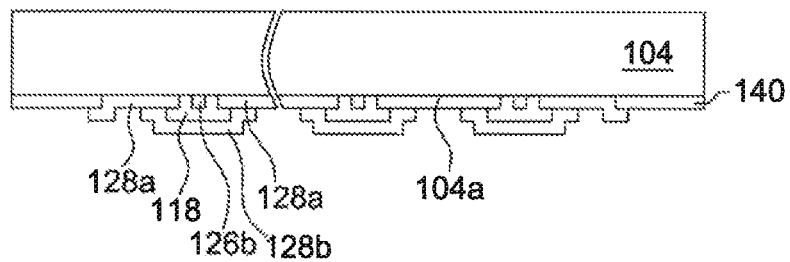
FIG. 8 is a section view of a touch sensing electrode set according to the first embodiment of the present invention.

Again referring to FIG. 1, in this embodiment, the touch sensing electrode set 106 is disposed between the display panel 102 and the cover plate 104 in the touch display region 100a. FIG. 7 shows a top view of a touch sensing electrode set according to the first embodiment of the present invention. FIG. 8 shows a section view of a touch sensing electrode set according to the first embodiment of the present invention. Referring to FIG. 7 and FIG. 8 as well as FIG. 1, the touch sensing electrode set 106 of this embodiment is directly formed on the second surface 104a of the cover plate 104, and may be formed by the first conductive pattern layer C1, the second conductive pattern layer C2 and the first insulating layer 118 that form the fingerprint recognition electrode set 110. More specifically, the touch sensing electrode set 106 includes a plurality of third electrode strips 126 and a plurality of fourth electrode strips 128. The third electrode strips 126 cross the fourth electrode strips 128, and the third electrode strips 126 are electrically insulated from the fourth electrode strips 128. The third electrode strips 126 and the fourth electrode strips 128 are formed by the first conductive pattern layer C1 and/or the second conductive pattern layer C2. In this embodiment, each of the third electrode strips 126 may include a plurality of electrode portions 126a and a plurality of bridge portions 126b. Each of the bridge portions 126b is connected between any two adjacent electrode portions 126a, and each of the electrode portions 126a and each of the bridge portions 126b are sequentially and alternately arranged along a direction D3 and are connected to form one single third electrode strip 126. Each of the fourth electrode strips 128 includes a plurality of electrode pads 128a and a plurality of bridge electrodes 128b. Each of the bridge electrodes 128b is connected between any two adjacent electrode pads 128a, and each of the electrode pads 128a and each of the bridge electrodes 128b are sequentially and alternately arranged along a direction D4 different from the direction D3 and are connected to form one single fourth electrode strip 128. In this embodiment, for example but not limited to, the third electrode strips 126 may serve as driving electrodes for transmitting driving signals, and the fourth electrode strips 128 may serve as sensing electrodes for sensing capacitance changes. The first insulating layer 118 is disposed between the bridge electrodes 128b and the bridge portions 126b that cross each other, such that the third electrode strips 126 and the fourth electrode strips 128 are electrically insulated. The third electrode strips 126 and the electrode pads 128a may be formed by the first conductive pattern layer C1, and the bridge electrodes 128b may be formed by the second conductive pattern layer C2. The first conductive pattern layer C1 and the second conductive pattern layer C2 may include a transparent conductive material, so as to allow lights of the display panel 102 to penetrate the touch sensing electrode set 106, enabling a viewer to perceive the image. In another embodiment, the third electrode strips and the electrode pads may be formed by the second conductive pattern layer, and the bridge electrodes may be formed by the first conductive pattern layer. Alternatively, for example but not limited to, the third electrode strips include electrode pads and bridge pads, and the fourth electrode strips include electrode portions and bridge portions, the electrode pads and the fourth electrode strips are formed by one of the first conductive pattern layer and the second conductive pattern layer, and the bridge electrodes are formed by the other of the conductive electrode layers.

In this embodiment, the touch display apparatus 100 may further include a first adhesive layer 130 for attaching the cover plate 104 formed with the touch sensing electrode set 106 and the fingerprint recognition module 108 onto the first surface 102a of the display panel 102. It should be noted that, the touch sensing electrode set 106 and the fingerprint recognition electrode set 110 of this embodiment are formed on the second surface 104a of the cover plate 104, so as to integrate the touch sensing electrode set 106 and the fingerprint recognition electrode set 110 in the same touch panel. Thus, the weight of the touch display apparatus 100 may be lowered to alleviate the load of the user, and manufacturing and assembly complications of the touch sensing electrode set 106 and the fingerprint recognition electrode set 110 may be reduced.

Figure 9:
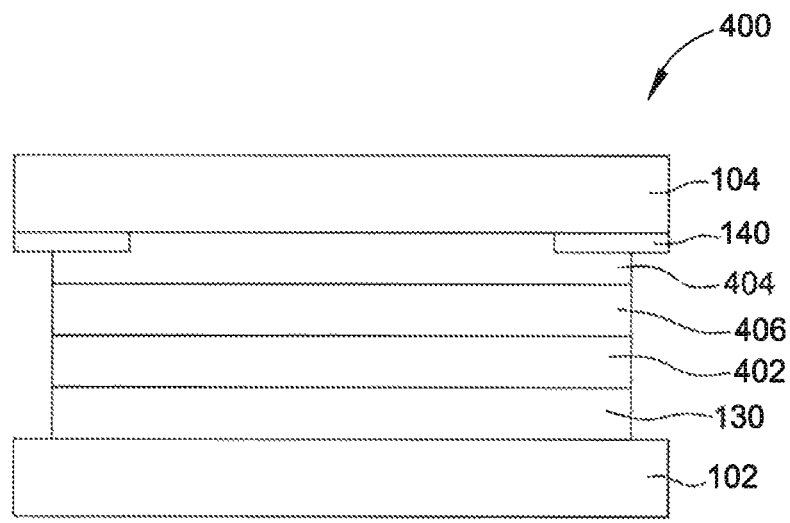
FIG. 9 is a section view of a touch display apparatus according to a second embodiment of the present invention.

FIG. 9 shows a section view of a touch display apparatus according to a second embodiment of the present invention. Compared to the first embodiment, a touch sensing electrode set 406 is not formed on the cover plate 104. Instead, a touch display apparatus 400 further includes a first transparent substrate 402 disposed between the cover plate and the display panel, and the touch sensing electrode set 406 is formed on a surface of the first transparent substrate 402. In this embodiment, the touch sensing electrode set 406 is directly formed on the surface of the first transparent substrate 402 facing the cover plate 104. The touch display apparatus 400 further includes a second adhesive layer 404 for attaching the first transparent substrate 402 formed with the touch sensing electrode set 406 on the second surface 104a of the cover plate 104. Further, the first transparent substrate 402 may be attached to the first surface 102a of the display panel 102 through the first adhesive layer 130. In this embodiment, as the touch sensing electrode set 406 and the fingerprint recognition electrode set 110 are formed on different substrates, the third electrode strips and the fourth electrode strips of the touch sensing electrode set 406 may be formed by two other conductive pattern layers to be electrically insulated from the conductive pattern layers through different insulating layers. In this embodiment, the touch sensing electrode set 406 may be structurally identical to the first embodiment, i.e., as shown in FIG. 7 and FIG. 8, and such details shall be omitted. In this embodiment, the first transparent substrate 402 may include a flexible substrate or a hard substrate. For example but not limited to, the flexible substrate may be a soft film, and the hard substrate may be a glass substrate. In another embodiment, the touch sensing electrode set may also be formed on the surface of the first transparent substrate facing the display panel.

Figure 10:
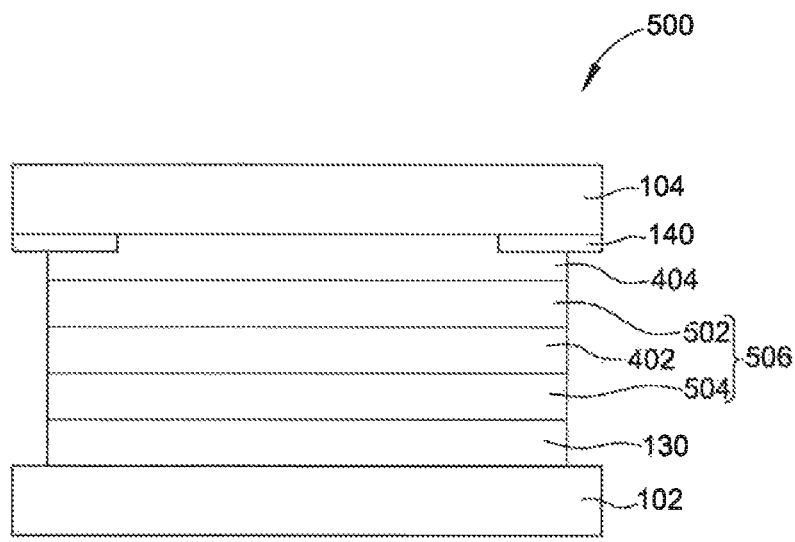
FIG. 10 is a section view of a touch display apparatus according to a third embodiment of the present invention.

FIG. 10 shows a section view of a touch display apparatus according to a third embodiment of the present invention. Referring to FIG. 10, compared to the second embodiment, third electrode strips 502 and fourth electrode strips 504 of a touch display apparatus 500 are formed by different transparent conductive pattern layers, with one formed on the surface of the first transparent substrate 402 facing the cover plate 104, and the other formed on the surface of the first transparent substrate 402 facing the display panel 102. Because the first transparent substrate 402 is disposed between the third electrode strips 502 and the fourth electrode strips 504, a touch sensing electrode set 506 of this embodiment need not be disposed between the third electrode strips 502 and the fourth electrode strips 504.

Figure 11:
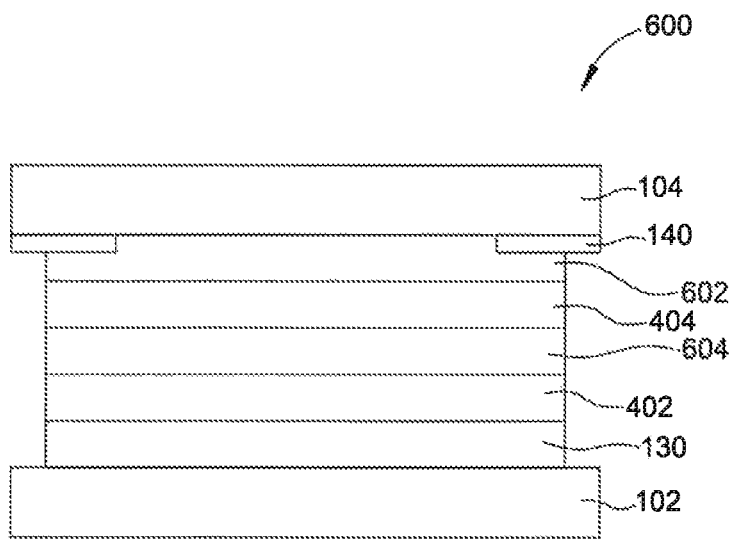
FIG. 11 is a section view of a touch display apparatus according to a fourth embodiment of the present invention.

FIG. 11 shows a section view of a touch display apparatus according to a fourth embodiment of the present invention. Referring to FIG. 11, compared to the third embodiment, third electrode strips 602 and fourth electrode strips 604 of a touch display apparatus 600 of this embodiment are respectively formed on different substrates. More specifically, the third electrode strips 602 are formed on the second surface 104a of the cover plate 104, and the fourth electrode strips 604 are formed on the surface of the first transparent substrate 402 facing the cover plate 104. The second adhesive layer 404 is disposed between the third electrode strips 602 and the fourth electrode strips 604, and electrically insulates the two from each other. In another embodiment, the fourth electrode strips may be formed on the surface of the first transparent substrate facing the display panel. In yet another embodiment, the positions of the third electrode strips and the fourth electrode strips may be exchanged, or the third electrode strips may be formed on the surface of the first transparent substrate facing the display panel when the positions of the two are exchanged.

Figure 12:
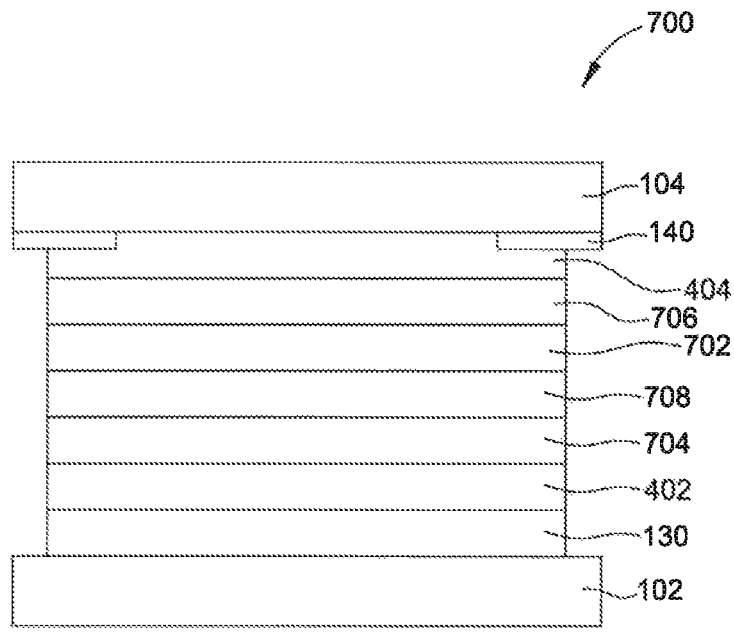
FIG. 12 is a section view of a touch display apparatus according to a fifth embodiment of the present invention.

FIG. 12 shows a section view of a touch sensing apparatus according to a fifth embodiment of the present invention. Referring to FIG. 12, compared to the fourth embodiment, third electrode strips 702 and fourth electrode strips 704 are formed on different substrates that are other from the cover plate and the display panel. More specifically, the touch display apparatus 700 further includes a second transparent substrate 706 and a third adhesive layer 708 disposed between the first transparent substrate 402 and the cover plate 104, and one of the third electrode strips 702 and the fourth electrode strips 704 are formed on the second transparent substrate 706 while the other are formed on the on the first transparent substrate 402. Further, the first transparent substrate 402 and the second transparent substrate 706 may be attached to each other though the third adhesive layer 708. In another embodiment, the third electrode strips may be formed on the surface of the second transparent substrate facing the cover plate, and/or the fourth electrode strips may be formed on the surface of the first transparent substrate facing the display panel.

Figure 13:
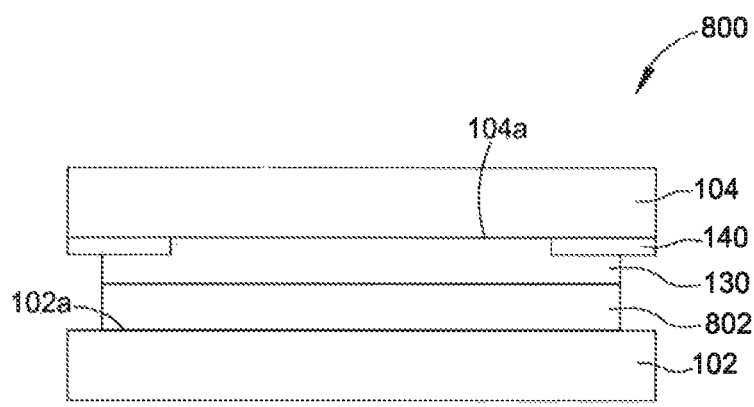
FIG. 13 is a schematic diagram of a touch display apparatus according to a sixth embodiment of the present invention.

FIG. 13 shows a schematic diagram of a touch display apparatus according to a sixth embodiment of the present invention. One difference from the first embodiment is that, a touch sensing electrode set 802 of a touch display apparatus 800 of this embodiment is formed on the first surface 102a of the display panel 102.

Figure 14:
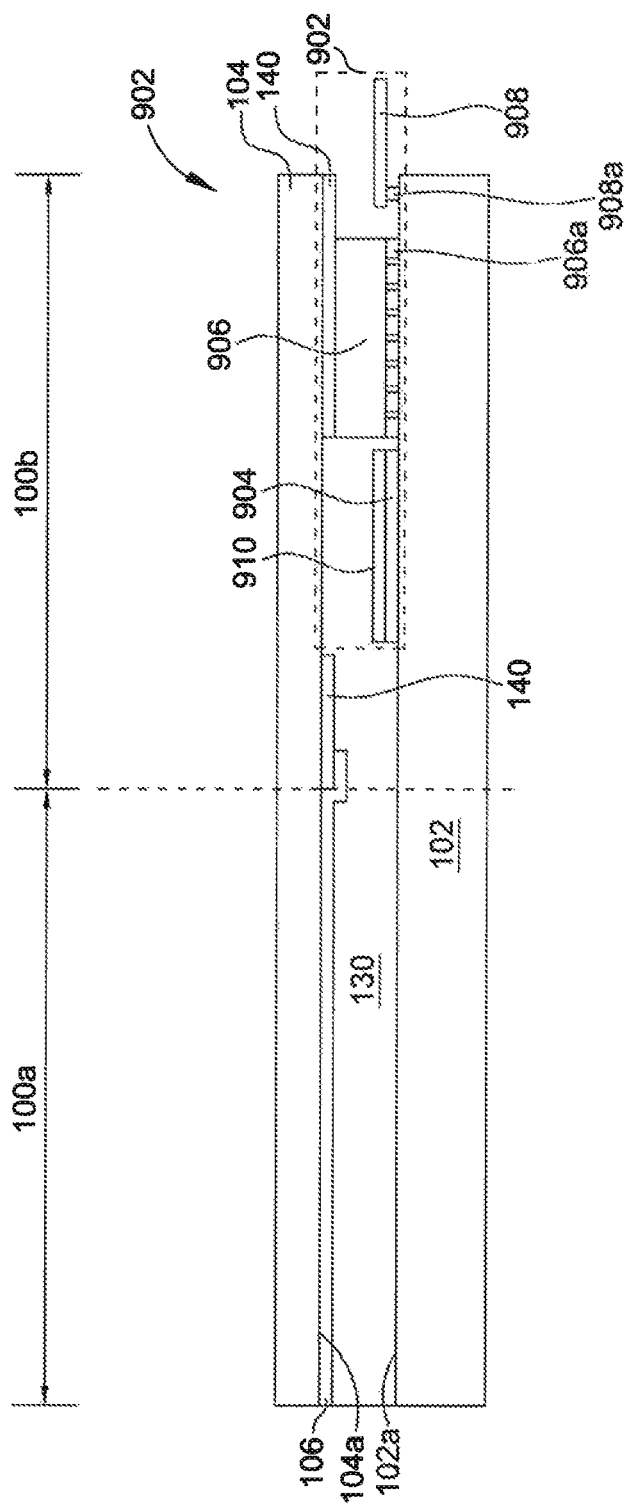
FIG. 14 is a section view of a touch display apparatus according to a seventh embodiment of the present invention.

FIG. 14 shows a section view of a touch display apparatus according to a seventh embodiment of the present invention. As shown in FIG. 14, compared to the first embodiment, a fingerprint recognition module 902 of a touch display apparatus 900 of this embodiment is formed on the first surface 102a of the display panel 102. More specifically, a fingerprint recognition electrode set 904 is directly formed on the first surface 102a, and a chip 907 and a flexible circuit board 908 are soldered to conducting lines on the first surface 102a through solder pads 906a and 908a. Further, a second decoration layer 910 may be formed on the fingerprint recognition electrode set 904, and cover the fingerprint recognition electrode set 904. In another embodiment, in the first and second variations of the fingerprint recognition electrode set and the touch display apparatus of the second to sixth embodiments, the fingerprint recognition module may also be formed on the first surface of the display panel. When the touch sensing electrode set and the fingerprint recognition module are both formed on the first surface of the display panel, the third electrode strips and the fourth electrode strips are formed by the first conductive pattern layer and/or the second conductive pattern layer.

Figure 15:
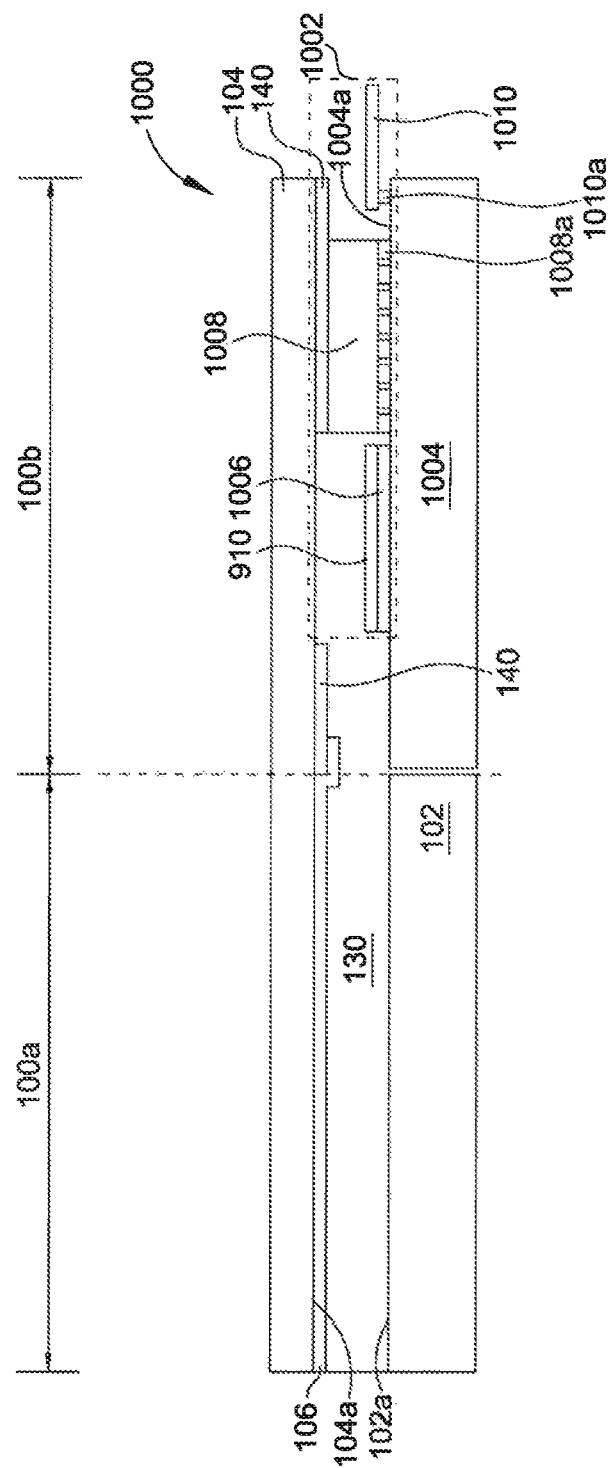
FIG. 15 is a section view of a touch display apparatus according to an eighth embodiment of the present invention.

FIG. 15 shows a section view of a touch display apparatus according to an eighth embodiment of the present invention. As shown in FIG. 15, compared to the seventh embodiment, the display panel 102 of a touch display apparatus 1000 of this embodiment does not extend into the border region 100*b*, and so a fingerprint recognition module 1002 is not formed on the first surface 102*a* of the display panel 102. Instead, the touch display apparatus 1000 further includes a substrate 1004 disposed in the border region 100*b*. The substrate 1004 includes a third surface 1004*a* facing the second surface 104*a* of the cover plate 104*a*, and the fingerprint recognition module 1002 is formed on a third surface 1004*a* of the substrate 1004. More specifically, a fingerprint recognition electrode set 1006 is directly formed on the third surface 1002*a*, and a chip 1008 and a flexible circuit board 1010 are soldered to conducting lines on the third surface 1002*a* through solder pads 1008*a* and 1010*a*. Other details of the fingerprint recognition electrode set 1006, the chip 1008 and the flexible circuit board 1010 are identical to those of the first embodiment, and shall be omitted herein. In this embodiment, for example but not limited to, the substrate 1002 may include a glass substrate. Further, the second decoration layer 910 may be formed on the fingerprint recognition electrode set 1006 and cover the fingerprint recognition electrode set 1006.

In conclusion, the touch sensing electrode set and the fingerprint recognition module of the present invention are integrated into the same touch display panel. Thus, the weight of the touch display apparatus may be lowered to alleviate the load of the user, and manufacturing and assembly complications of the touch sensing electrode set and the fingerprint recognition electrode set may be eliminated.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display apparatus capable of fingerprint recognition, comprising:
   a display panel, comprising a first surface;
   a cover plate, located above the first surface of the display panel;
   a touch sensing electrode set, disposed between the display panel and the cover plate;
   a fingerprint recognition electrode set, disposed between the display panel and the cover plate,
   wherein the cover plate comprises a second surface facing the first surface, and the fingerprint recognition electrode set is formed on the second surface;
   a chip, soldered on the second surface and electrically connected to the fingerprint recognition electrode set,
   wherein the chip is not electrically connected to the touch sensing electrode set, and a flexible circuit board is soldered on the second surface and electrically connected to the chip,
   wherein the fingerprint recognition electrode set comprises a plurality of first electrode strips, a plurality of second electrode strips and a plurality of floating electrodes electrically insulated from each other, and the first electrode strips cross the second electrode strips,
   wherein the plurality of floating electrodes are formed by same conductive pattern layer as the plurality of first electrode strips or the plurality of second electrode strips.

2. The touch display apparatus capable of fingerprint recognition according to claim 1, further comprising at least one key formed on the second surface and electrically connected to the chip.

3. The touch display apparatus capable of fingerprint recognition according to claim 1, wherein the first electrode strips are electrically insulated from the second electrode strips, the first electrode strips are formed by a first conductive pattern layer, the second electrode strips are formed by a second conductive pattern layer, and a gap between center lines of any two adjacent first electrode strips is 40 μm to 60 μm.

4. The touch display apparatus capable of fingerprint recognition according to claim 1, wherein the cover plate comprises a second surface facing the first surface, the touch display apparatus further comprises a first decoration layer formed on the second surface and a second decoration layer disposed between the cover plate and the fingerprint recognition electrode set, wherein the first decoration layer and the second decoration layer have different appearances.

5. The touch display apparatus capable of fingerprint recognition according to claim 1, wherein the plurality of first electrode strips cross the plurality of second electrode strips to form a plurality of regions, and each of the plurality of regions comprises at least one floating electrode.

6. The touch display apparatus capable of fingerprint recognition according to claim 5, wherein each of the plurality of regions comprises four floating electrodes.

7. A touch display apparatus capable of fingerprint recognition, comprising:
   a display panel, comprising a first surface;
   a cover plate, located above the first surface of the display panel, comprising a second surface facing the first surface;
   a touch sensing electrode set, disposed between the display panel and the cover plate;
   a substrate, comprising a third surface facing the second surface;
   a fingerprint recognition electrode set, formed on the third surface, wherein the cover plate covers the fingerprint recognition electrode set; and
   a chip soldered on the third surface and electrically connected to the fingerprint recognition electrode set,
   wherein the chip is not electrically connected to the touch sensing electrode set, and a flexible circuit board is soldered on the substrate and electrically connected to the chip,
   wherein the fingerprint recognition electrode set comprises a plurality of first electrode strips, a plurality of second electrode strips and a plurality of floating electrodes electrically insulated from each other, and the first electrode strips cross the second electrode strips, wherein the plurality of floating electrodes are formed by same conductive pattern layer as the plurality of first electrode strips or the plurality of second electrode strips.

8. The touch display apparatus capable of fingerprint recognition according to claim 7, further comprising a key formed on the substrate; wherein the key is electrically connected to the chip and triggers an operation instruction through the chip, and the operation instruction is irrelevant to fingerprint recognition.

9. The touch display apparatus capable of fingerprint recognition according to claim 7, comprising a key formed on the substrate, the key being electrically connected to the chip and triggering fingerprint recognition.

10. The touch display apparatus capable of fingerprint recognition according to claim 7, further comprising a first decoration layer formed on the second surface and a second decoration layer disposed between the cover plate and the fingerprint recognition electrode set, the first decoration layer and the second decoration layer having different appearances.

* * * * *